(12) United States Patent
Brinkman et al.

(10) Patent No.: US 12,269,472 B2
(45) Date of Patent: Apr. 8, 2025

(54) SYSTEMS AND METHODS FOR DETERMINING VEHICLE AND TRAILER RESISTANCE RELATED CHARACTERISTICS

(71) Applicant: GM GLOBAL TECHNOLOGY OPERATIONS LLC, Detroit, MI (US)

(72) Inventors: Todd J. Brinkman, Rochester Hills, MI (US); Matthew Giuffre, Chelsea, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 180 days.

(21) Appl. No.: 18/187,163

(22) Filed: Mar. 21, 2023

(65) Prior Publication Data
US 2024/0317228 A1   Sep. 26, 2024

(51) Int. Cl.
*B60W 30/18*  (2012.01)

(52) U.S. Cl.
CPC ... *B60W 30/18072* (2013.01); *B60W 2520/10* (2013.01); *B60W 2520/105* (2013.01); *B60W 2530/10* (2013.01); *B60W 2530/16* (2013.01); *B60W 2540/12* (2013.01); *B60W 2540/18* (2013.01)

(58) Field of Classification Search
CPC ....... B60W 2520/10; B60W 2520/105; B60W 2530/10; B60W 2530/16; B60W 2540/12; B60W 2540/18
USPC .......................................................... 701/70
See application file for complete search history.

(56) References Cited

U.S. PATENT DOCUMENTS

| | | |
|---|---|---|
| 3,893,692 A | 7/1975 | Presley et al. |
| 5,080,445 A | 1/1992 | Brearley et al. |
| 5,333,948 A | 8/1994 | Austin et al. |
| 5,713,639 A | 2/1998 | Doto et al. |
| 6,042,196 A | 3/2000 | Nakamura et al. |
| 6,139,118 A | 10/2000 | Hurst et al. |
| 6,705,684 B1 | 3/2004 | Garvey |
| 7,401,871 B2 | 7/2008 | Lu et al. |
| 8,930,114 B1 | 1/2015 | Reid |
| 9,020,729 B2 | 4/2015 | Maitlen et al. |
| 9,026,311 B1 | 5/2015 | Pieronek et al. |
| 9,738,125 B1 | 8/2017 | Brickley et al. |
| 9,908,377 B2 | 3/2018 | Allcorn et al. |
| 10,252,589 B2 | 4/2019 | Sielhorst |
| 10,363,910 B2 | 7/2019 | Kulkarni et al. |
| 10,670,479 B2 | 6/2020 | Reed et al. |
| 10,703,345 B2 | 7/2020 | Niedert et al. |
| 10,836,366 B2 | 11/2020 | James et al. |
| 11,014,417 B2 | 5/2021 | Reed et al. |
| 11,084,342 B2 | 8/2021 | Reed et al. |

(Continued)

*Primary Examiner* — Mahmoud Gimie
(74) *Attorney, Agent, or Firm* — Lorenz & Kopf LLP

(57) ABSTRACT

Methods and systems determine resistance related constants for use by a vehicle towing a trailer. A system for controlling functions of the vehicle and the trailer includes sensors that provide sensor data. A processor performs a readiness check, based on the sensor data, by determining whether the sensor data exceeds predetermined thresholds. When the readiness check is passed, meaning the thresholds are not exceeded, and based on the sensor data, the processor computes values for constants that represent aerodynamic resistance and rolling resistance of the vehicle and the trailer. Based on the constants, the processor controls functions of the vehicle.

20 Claims, 5 Drawing Sheets

(56) References Cited

U.S. PATENT DOCUMENTS

| | | |
|---|---|---|
| 11,135,882 B2 | 10/2021 | Reed et al. |
| 11,167,737 B2 | 11/2021 | Falcon et al. |
| 11,221,262 B2 | 1/2022 | Reed et al. |
| 11,225,235 B2 | 1/2022 | DiGioacchino et al. |
| 11,485,330 B1 | 11/2022 | Kulkarni |
| 11,524,663 B2 | 12/2022 | Prohaszka et al. |
| 2006/0071549 A1 | 4/2006 | Chesnut et al. |
| 2007/0001509 A1 | 1/2007 | Brown et al. |
| 2011/0042154 A1 | 2/2011 | Bartel |
| 2014/0046566 A1 | 2/2014 | Maitlen |
| 2015/0232075 A1 | 8/2015 | Fosdike |
| 2015/0275991 A1 | 10/2015 | De Leon |
| 2015/0353063 A1 | 12/2015 | Tuhro et al. |
| 2017/0001639 A1* | 1/2017 | Dempsey ................ G08G 1/16 |
| 2018/0079394 A1 | 3/2018 | Cekola et al. |
| 2018/0215358 A1 | 8/2018 | Hall et al. |
| 2018/0339685 A1 | 11/2018 | Hill et al. |
| 2019/0217866 A1 | 7/2019 | Greguer |
| 2019/0225196 A1 | 7/2019 | Niedert et al. |
| 2020/0031326 A1 | 1/2020 | Henriksson |
| 2020/0290579 A1 | 9/2020 | Lievore |
| 2021/0139008 A1 | 5/2021 | DiGioacchino et al. |
| 2022/0017050 A1 | 1/2022 | Lievore |
| 2023/0227011 A1 | 7/2023 | Zengin et al. |
| 2023/0242084 A1 | 8/2023 | Fosdike |
| 2024/0042976 A1 | 2/2024 | Kirmaier et al. |
| 2024/0067148 A1 | 2/2024 | Ripley et al. |
| 2024/0208473 A1 | 6/2024 | Lievore |
| 2024/0262322 A1 | 8/2024 | Castillo |

* cited by examiner

SYSTEMS AND METHODS FOR DETERMINING VEHICLE AND TRAILER RESISTANCE RELATED CHARACTERISTICS

INTRODUCTION

The present disclosure relates to methods and systems for determining vehicle and trailer characteristics using the aerodynamic and rolling resistance factors of the vehicle-trailer combination, and more particularly relates to determining constants representative of deceleration components for uses such as determining range estimates, mass estimates and braking functions.

A variety of vehicles are equipped for towing trailers that are selectively coupled to the vehicles. Aerodynamic resistance (drag) is a force on a vehicle that resists its motion through the air as the air is required to be displaced for the vehicle to move. Rolling resistance or rolling friction is a force that resists motion of a vehicle due to the friction incurred when moving the vehicle on its wheels. In addition, the force of gravity will work on a vehicle operating on a slope and motoring forces arise due to operation of the vehicle's engine. As such, a coasting vehicle will gradually slow due to the effects of resistance forces.

The resistance force characteristics of the vehicle with an attached trailer vary greatly and are unknown because of unique characteristics of the trailer and its effects on the vehicle. Each vehicle/trailer combination will have specific aerodynamic resistance and rolling resistance characteristics and so each time a different trailer is coupled with a vehicle, new unknown parameters apply.

Because the resistance forces of a vehicle and trailer combination deviate greatly from resistance forces of the vehicle alone, towing a trailer can result in errors in the outputs of various vehicle algorithms such as driving range, energy economy, coasting distance estimates and vehicle mass estimates. In addition, determining optimum trailer brake gain settings for each trailer and vehicle combination may be challenging. Knowing the resistance forces that act on a vehicle and trailer combination would be beneficial for a variety of uses, including those that effect performance and fuel economy.

Accordingly, it is desirable to provide improved methods and systems for determining resistance forces that act on vehicle and trailer combinations. It would also be desirable to more precisely determine driving range estimates, energy economy status, coasting distance estimates, vehicle mass estimates, and trailer brake gain settings. Furthermore, other desirable features and characteristics of the present disclosure will become apparent from the subsequent detailed description and the appended claims, taken in conjunction with the accompanying drawings and the foregoing introduction.

SUMMARY

Methods and systems use coast-down data to develop relations that define resistance force related parameters for use in vehicle control. A system for controlling functions of the vehicle and the trailer includes sensors that provide sensor data. A processor performs a readiness check, based on the sensor data, by determining whether the sensor data exceeds predetermined thresholds. Based on the sensor data and when the readiness check is passed, meaning the thresholds are not exceeded, the processor computes values for constants that represent aerodynamic resistance and rolling resistance of the vehicle and the trailer. Based on the constants, the processor controls functions of the vehicle.

In additional embodiments, prior to computing the constants, the processor controls the functions of the vehicle based on generic constants predetermined and stored in memory.

In additional embodiments, the sensors include a speed sensor that provides speed signals representative of speed of the vehicle, a brake sensor that provides brake signals representative of brake application of the vehicle, and a steering angle sensor that provides steering signals representative of angles at which wheels of the vehicle are turned.

In additional embodiments, the processor corrects the values based on a motoring force of the vehicle.

In additional embodiments, prior to computing the values for the constants, the processor determines, from an acceleration sensor, coasting deceleration at various speeds during operation of the vehicle.

In additional embodiments, the processor, with input of the sensors, collects deceleration data across the range of speeds of the vehicle and the trailer. The constants are based on the deceleration data.

In additional embodiments, the processor, based on the constants, computes a combined weight of the vehicle and the trailer.

In additional embodiments, an interface communicates information to and from the processor. The processor determines a weight change of the vehicle and the trailer, and communicates, through the interface and after the weight change, a need to update the constants.

In additional embodiments, the processor accesses data limits from a memory and rationalizes the constants by restricting the constants to within the data limits.

In additional embodiments, one of the constants represents a combination of air density, an aerodynamic drag coefficient, a frontal area of the vehicle and the trailer, and mass of the vehicle and the trailer, and another of the constants represents a combination of a rolling resistance coefficient of the vehicle and the trailer and acceleration of gravity.

In a number of other embodiments, a method for controlling functions of a vehicle and a trailer includes sensors of the vehicle that provide sensor data. Based on the sensor data, a processor performs a readiness check by determining whether the sensor data exceeds predetermined thresholds. Based on the sensor data and when the readiness check is passed, meaning the predetermined thresholds are not exceeded, the processor computes values for constants that represent aerodynamic resistance and rolling resistance of the vehicle and trailer specifically. Based on the constants, the processor controls functions of the vehicle.

In additional embodiments, generic predetermined constants are used that represent the aerodynamic resistance and the rolling resistance of the vehicle and the trailer. The generic constants are stored in a memory accessible by the processor. Prior to computing of the constants, the processor controls the functions of the vehicle based on the generic constants. the processor computes providing the sensor data comprises:

In additional embodiments a speed sensor provides speed signals representative of speed of the vehicle, a brake sensor provides brake signals representative of brake application of the vehicle, and a steering angle sensor provides steering signals representative of angles at which wheels of the vehicle are turned.

In additional embodiments, the processor corrects the values based on a motoring force of the vehicle.

In additional embodiments, the processor, with input from an acceleration sensor and prior to computing the values for the constants, determines coasting deceleration at various speeds during operation of the vehicle.

In additional embodiments, the processor with input of the sensors, collects deceleration data across the range of speeds of the vehicle and the trailer. Computing the values for the constants is based on the deceleration data.

In additional embodiments, the processor, based on the constants, computes a combined weight of the vehicle and the trailer.

In additional embodiments, an interface in the vehicle communicates information to and from the processor. The processor determines a weight change of the vehicle and the trailer. The processor, through the interface and after the weight change, communicates a need to update the constants.

In additional embodiments, the processor accesses, from a memory, data limits and rationalizes the constants by restricting the constants to within the data limits.

In a number of additional embodiments, a vehicle that is capable of towing trailers includes sensors that provide data on the vehicle. Based on the sensor data, a processor performs a readiness check by determining whether the sensor data exceeds predetermined thresholds. Based on the sensor data and when the readiness check is passed, meaning the predetermined thresholds are not exceeded, the processor computes a value for a constant that represents an aerodynamic resistance of the vehicle and the trailer, and computes a value for another constant that represents a rolling resistance of the vehicle and the trailer. From the constants, the processor computes a command value for a controlled parameter of the vehicle and controls a system of the vehicle based on the commend value.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of automated driving systems including cruise control systems, automated driver assistance systems and autonomous driving systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
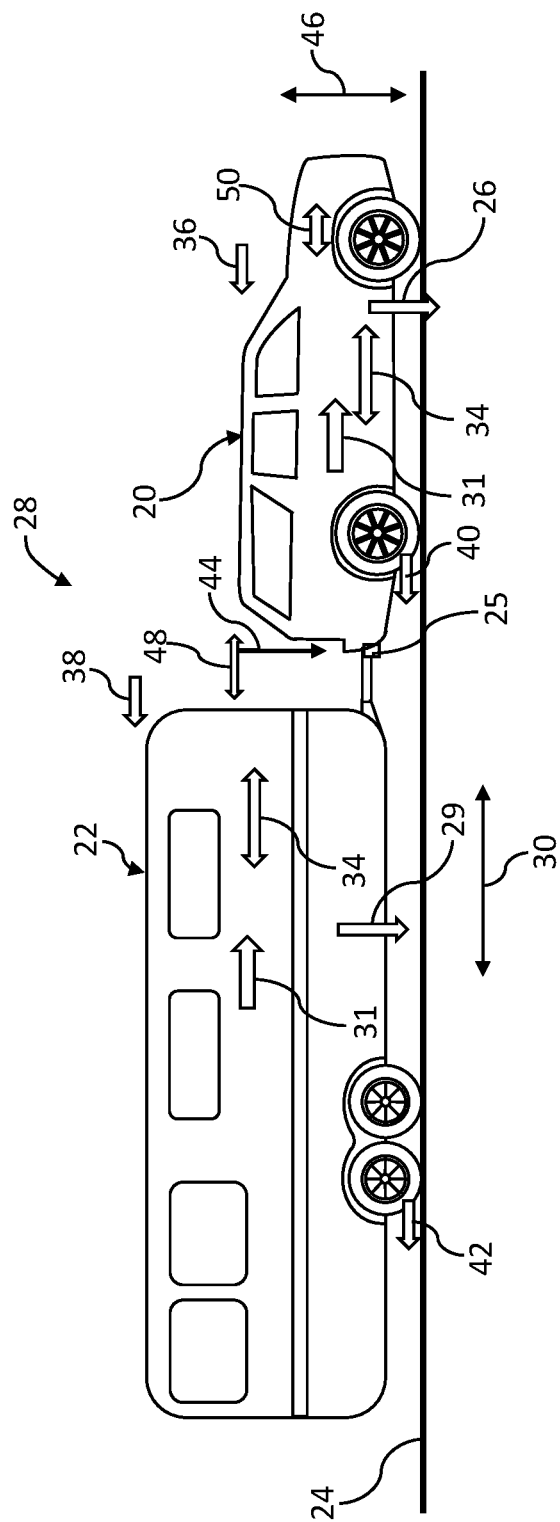
FIG. 1 is a schematic illustration of a vehicle-trailer system showing various parameters, in accordance with exemplary embodiments.

Referring to FIG. 1, a vehicle 20 towing a trailer 22 is illustrated travelling on a roadway 24. The trailer 22 may be releasably coupled with the vehicle 20 by a hitch 25 for travel over the roadway 24. The hitch 25 may be configured for any of various types of hitching, including ball-type, fifth-wheel, gooseneck, pintle, etc. As used herein, "vehicle" may refer to a host vehicle, such as the vehicle 20, that tows a towed vehicle, "trailer," such as the trailer 22. The term tow-vehicle may also be used to refer to the vehicle 20 doing the towing. The term towed vehicle may be used to refer to the vehicle (trailer 22) that is towed. In embodiments, a motorized automobile may serve as the vehicle 20 towing the trailer 22 in a vehicle-trailer system 28.

The trailer 22 is illustrated for representation purposes and may be any mobile apparatus being towed by the vehicle 20, such as a boat trailer, a camping trailer, a utility trailer, a specialized type of mobile equipment, etc. When the vehicle-trailer system 28 operates on the roadway 24 various parameters may be used to describe the vehicle 20 and/or the trailer 22. The vehicle 20 has a weight ($W_V$) 26, and the trailer has a weight ($W_T$) 29. The vehicle 20 and the trailer 22 will have a common velocity (v) 31 value in the longitudinal direction (x) 30, which may also be referred to as speed. The vehicle 20 and the trailer 22 will have a common acceleration (a) 34 value in the longitudinal direction (x) 30. The acceleration/a 34 may be an increasing acceleration, a zero acceleration, or a decreasing acceleration (deceleration). The inertia force ($F_{av}$) of the moving vehicle 20 is its mass multiplied by its acceleration ($m_v a_x$). The inertia force ($F_{at}$) of the moving trailer 22 is its mass multiplied by acceleration ($m_t a_x$). The inertia force ($F_{avt}$) of the moving vehicle 20 and trailer 22 combination is their mass multiplied by acceleration ($m_{vt}a_x$). When moving, the vehicle 20 and the trailer 22 work against a number of forces that work against the inertia force/$F_{avt}$.

An aerodynamic resistance force ($F_{AV}$) 36 works against the vehicle 20, and the trailer 22 works against an aerodynamic resistance force ($F_{AT}$) 38. The aerodynamic resistance forces $F_{AT}$ 36 and $F_{AT}$ 38 account for aerodynamics/air resistance or drag. The aerodynamic individual, or in this case combined, resistance forces $F_{AV}$ 36 and $F_{AT}$ 38 may be determined by the equation:

$$F = \frac{\rho\, C_d\, A v^2}{2},$$

where $\rho$ is air density, $C_d$ is the applicable aerodynamic drag coefficient, A=vehicle/trailer combined frontal area, and v is vehicle/trailer speed/velocity 31.

A rolling resistance force ($F_{RV}$) 40 works against the vehicle 20, and the trailer 22 works against a rolling resistance force ($F_{RT}$) 42. The rolling resistance forces $F_{RV}$ 40 and $F_{RT}$ 42 account for rolling friction that resists motion of a vehicle due to the friction incurred when moving the vehicle on its wheels. The individual, or in this case combined, rolling resistance forces $F_{RV}$ 40 and $F_{RT}$ 42 may be determined using the equation F=$mgC_{rr}$, where m is the gross combined mass (weight/gravity) of the vehicle 20 and the trailer 22, g is the gravitational constant of 9.81 m/s², and $C_{rr}$ is the rolling resistance drag coefficient of the vehicle-trailer system 28.

The force of gravity ($F_g$) 44 acts on the vehicle 20 and the trailer 22 in the vertical direction (v) 46. The force of gravity/$F_g$ 44 includes a component ($F_{gx}$) 48 in the longitudinal direction/x 30 when the roadway 24 slopes. The component/$F_{gx}$ 48 may also be referred to as a hill climbing/descent force. The force component/$F_{gx}$ 48 may be represented by the equation: F=mg sin ψ, where m is the gross combined mass (weight/gravity) of the vehicle 20 and the trailer 22, g is the gravitational constant 9.81 m/s², and ψ is the angle of the roadway 24 relative to horizontal, e.g., slope angle of the roadway 24.

Motoring force ($F_M$) 50 is related to powertrain pumping torque and may be described as the difference between rolling in neutral (rolling resistance force ($F_{RV}$) 40 plus rolling resistance force ($F_{RT}$) 42), and rolling while in gear. This drive train resistance is a function of the gear ratio in which the drive train is engaged. The pumping torque is a function of engine load and engine speed. Pumping torque may be represented by the equation $T_{pump}$=$f_{Tpump}$(L, S), where $T_{pump}$ is pumping work in newton-meters, L is engine load as a normalized dimensionless cylinder air mass, and S is engine speed in revolutions per minute.

As further described below; the various parameters described herein may be known values, may be determined, or may be estimated. The parameters may be used to evaluate/define various aspects of the vehicle 20 and/or of the trailer 22 and to make control determinations for functions of the vehicle 20 and/or the trailer 22, which may be carried out by the various actuators. Those various control determinations may involve fuel/battery range of the vehicle 20 with the trailer 22, mass of the vehicle-trailer system 28, energy economy status, coasting distance estimates, trailer brake gain settings, and others.

It will be appreciated that multiple forces act on the vehicle 20 and on the trailer 22 while moving on the roadway 24. In addition to those described above, other forces may act on the vehicle-trailer system 28. For example, angular acceleration related to rotation of engine components that also represent a force (or torque), that may act on the vehicle 20. However, the force required for angular acceleration within the vehicle 20 is much (e.g., an order of magnitude) smaller than the force associated with acceleration of the vehicle 20 and so may be insignificant for a variety of purposes and may not be factored into the results in various embodiments.

From the foregoing, it may be concluded that to move, the vehicle-trailer system 28 must overcome the aerodynamic resistance forces $F_{AV}$ 36 and $F_{AT}$ 38, the rolling resistance forces $F_{RV}$ 40 and $F_{RT}$ 42, the component ($F_{gx}$) 48 of the force of gravity/$F_g$ 44, and the motoring force/$F_M$ 50. This relation may be represented and described as $F_{total}$=aerodynamic resistance forces $F_{AV}$ 36 and $F_{AT}$ 38+the rolling resistance forces $F_{RV}$ 40 and $F_{RT}$ 42+the component ($F_{gx}$) 48 of the force of gravity/$F_g$ 44, +the motoring force/$F_M$ 50. In equation form this may be described by:

$$F_{total} = \frac{\rho\, C_d\, A v^2}{2} + mgC_{rr} + F_{gx} + F_M.$$

In a number of embodiments, the component ($F_{gx}$) 48 of the force of gravity/$F_g$ 44 may be discounted/ignored as further described below. This is because it may be assumed to be zero, which is the case where the roadway 24 is level without a significant slope. In a number of embodiments, the motoring force/$F_M$ 50 may be replaced by using a data correction factor (CF) that accounts for the influence of powertrain pumping torque during deceleration of the vehicle-trailer system 28 and that is a function of the specific design of the powertrain of the vehicle 20. The data correction factor/CF may be applied as a component of the force/$F_{total}$, or as a multiplier/addition in defining the resistance force or related characteristics/constants of the vehicle-trailer system 28. As a result of the use of the correction factor and a level roadway 24, the total force may be represented by:

$$F_{total} = \frac{\rho\, Cd\, A\, V2}{2} + M\, G\, Crr.$$

The data correction factor/CF may be established by modelling using commercially available software as supplemented by characteristic testing of the vehicle 20 application.

Various control operations may preferably be altered when the trailer 22 is connected with the vehicle 20 as compared to the control operations that are implemented when the vehicle 20 operates on its own. This is because the relevant parameters of the vehicle-trailer system 28 may be different than those of the vehicle 20 alone. For example, weight, resistance, etc. will be different. As a nonlimiting example, the range and other fuel/charge related characteristics may vary significantly when the trailer 22 is attached to the vehicle 20. Heretofore, the ability to determine these and other characteristics of the vehicle-trailer system 28 as opposed to the vehicle 20 alone has been limited. In the current embodiment the characteristics may be accurately estimated using the determined resistance forces acting on the vehicle-trailer system 28 as described herein.

Figure 2:
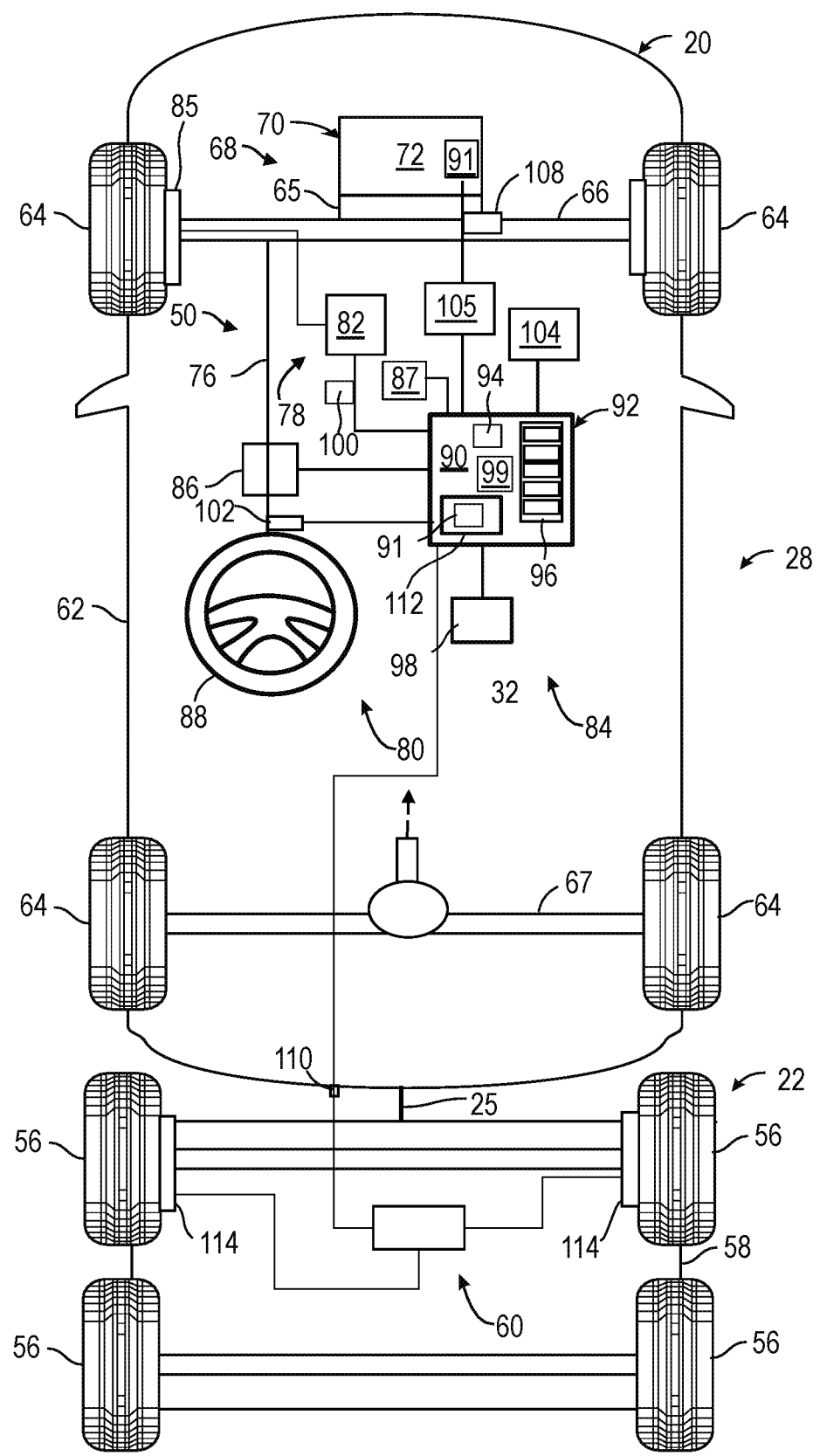
FIG. 2 is a functional block diagram of a vehicle-trailer system, in accordance with exemplary embodiments.

With reference to FIG. 2, certain features of the vehicle-trailer system 28 are illustrated in functional block diagram form. It will be appreciated that the vehicle 20 is adapted to operate as a tow-vehicle for towing a trailer, such as the trailer 22. In various embodiments, the vehicle 20 is an automobile. The vehicle 20 may be any one of a number of different types of automobiles, such as, for example, a sedan, a wagon, a van, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 20 may also include another type of mobile platform.

In various embodiments, the trailer 22 may include any number of different types of trailers and/or other types of mobile platforms, for example that are coupled to the vehicle 20 and move along with the vehicle 20. As depicted in FIG. 2, in various embodiments the trailer 22 includes, among other features, a plurality of wheels 56, a body 58, and a braking system 60. While the trailer 22 is depicted as having four wheels 56, it will be appreciated that the number of wheels 56 may vary in different embodiments.

As depicted in FIG. 2, the vehicle 20 includes a body 62 that is arranged on or integrated with a chassis. The body 62 substantially encloses other components of the vehicle 20. The vehicle 20 also includes a plurality of wheels 64. The wheels 64 are each rotationally coupled to the chassis near a respective corner of the body 62 to facilitate movement of the vehicle 20. In one embodiment, the vehicle 20 includes four wheels 64, although this may vary in other embodiments (for example for trucks and certain other vehicles).

A drive system 68 is mounted in the vehicle 20, and drives the wheels 64, for example via axles 66, 67. In certain embodiments, the drive system 68 includes a propulsion system 70. In certain exemplary embodiments, the propulsion system 70 includes a powerplant 72, such as an internal combustion engine and/or an electric motor/generator, that is coupled with a transmission 65. In certain embodiments, the drive system 68 may vary, and/or two or more drive systems 68 may be used. By way of example, the vehicle 20 may also incorporate any one of, or combination of, a number of different types of propulsion systems 70, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 2, the vehicle 20 also includes a braking system 78 and a steering system 80 in various embodiments. In exemplary embodiments, the braking system 78 controls braking of the vehicle 20 using an actuator 82 that may be controlled via inputs provided by a driver, such as through a brake pedal as the actuator 82, and in certain embodiments, via automatic control by a control system 84. The braking system 78 incudes brakes, such as brake 85, at any of the number of wheels 64. Also in exemplary embodiments, the steering system 80 controls steering of the vehicle 20 via an actuator 86, such as with inputs from a steering wheel 88 (e.g., in connection with a steering column coupled to the axle 66 and/or the wheels (4), that are controlled via inputs provided by a driver, and in certain embodiments via automatic control via the control system 84.

In the embodiment depicted in FIG. 2, the control system 84 is coupled with various systems including the braking system 78 and the steering system 80 of the vehicle 20, as well as with the braking system 60 of the trailer 22. In various embodiments, the control system 84 may also be coupled to one or more other systems and/or components of the vehicle 20 and/or the trailer 22 and includes a controller 90 and a gain control module 93. As illustrated in FIG. 2, the controller 90, the powertrain controller 112 and the gain control module 93 are a part of, or comprise, a computer system 92. It will be appreciated that the controller 90 may otherwise differ from the example depicted in FIG. 2. The controller 90 may be configured as any number of controllers and/or microcontrollers in communication with each other. The gain control module 93 may be integrated with the controller 90, or may be separate from the controller 90 and may be coupled therewith and with the trailer braking system 60. In general, the gain control module 93 scales the signal sent to the trailer braking system 60 based on a parameters and values determined as described herein, to direct the trailer braking system 60 to brake the trailer 22 when the braking system 78 is operated to brake the vehicle 20.

As illustrated in FIG. 2, the controller 90 is coupled with various devices and systems of the vehicle 20, such as the braking system 78 and the steering system 80. The controller 90 may accept information from various sources, process that information, and provide control commands based thereon to effect outcomes such as operation of the vehicle 20 and its systems, including of the braking system 78. In the depicted embodiment, the controller 90 includes a processor 94 and a memory device 96, and is coupled with a storage device 98. The processor 94 performs the computation and control functions of the controller 90, and may be any type of processor or multiple processors, single integrated circuits such as a microprocessor, or any suitable number of integrated circuit devices and/or circuit boards working in cooperation to accomplish the functions of a processing unit. During operation, the processor 94 may execute one or more programs and may use data, each of which may be contained within the storage device 98 and as such, the processor 94 controls the general operation of the controller 90 in executing the processes described herein, such as the processes and methods described in greater detail below:

The memory device 96 may be any type of suitable memory. For example, the memory device 96 may include volatile and nonvolatile storage in read-only memory (ROM), random-access memory (RAM), and keep-alive memory (KAM), for example. KAM is a persistent or non-volatile memory that may be used to store various operating variables while the processor 94 is powered down. The memory device 96 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 90. In the depicted embodiment, the memory device 96 may store the above-referenced programs along with one or more stored values of the data such as for short-term data access.

The storage device 98 stores data, such as for long-term data access for use in automatically controlling the vehicle 20 and its systems. The storage device 98 may be any suitable type of storage apparatus, including direct access storage devices such as hard disk drives, flash systems, floppy disk drives and optical disk drives. The storage device 98 is a non-transitory computer readable medium configured to store programs and data, such as on parameters of the vehicle 20 and the trailer 22. In one exemplary embodiment, the storage device 98 is a source from which the memory device 96 receives the programs that execute one or more embodiments of one or more processes of the present disclosure. In another exemplary embodiment, the programs may be directly stored in and/or otherwise accessed by the memory device 96. The programs represent executable instructions, used by the controller 90 in processing information and in controlling the vehicle 20 and its systems, including the braking system 78. While the components of the control system 84 are depicted as being part of the same system, it will be appreciated that in certain embodiments these features may comprise multiple systems. In addition, in various embodiments the control system 84 may comprise all or part of, and/or may be coupled to, various other vehicle devices and systems, such as, among others, the propulsion system 70 and/or other systems of the vehicle 20.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 94) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system 92 of the controller 90 may also otherwise differ from the embodiment depicted in FIG. 2.

The controller 90 is coupled with various actuators including the actuators 82, 86 and the propulsion system 70. The controller 90 is also coupled with various sensors that sense observable conditions of the vehicle-trailer system 28. In this embodiment, the sensing devices include, but are not limited to, a braking sensor 100 such as a pedal position sensor, a steering angle sensor 102, an acceleration sensor, such as an inertial measurement unit (IMU) 104, and a torque request sensor 105, such as at the accelerator pedal or throttle. The IMU 104 may include accelerometers and gyroscopes, which may be in electronic form to provide motion (such as acceleration), position, and navigational sensing over a number of degrees of freedom. For example, microelectromechanical system (MEMS) devices may be used to sense translation such as surge, heave and sway, and rotation such as roll, pitch and yaw.

In various embodiments, the braking sensor 100 is included in the braking system 78 of the vehicle 20, and measures an amount of braking relating thereto. In certain embodiments, the braking sensor 100 measures an amount of engagement thereof by a driver of the vehicle 20) (e.g., a measured amount of brake pedal travel and/or brake pedal force of the brake pedal and/or applied thereto based on engagement of the brake pedal by the driver). Also in various embodiments, the steering angle sensor 102 is included in the steering system 80 of the vehicle 20, and measures an indication of steering relating thereto. In certain embodiments, the steering angle sensor 102 measures an angle of the steering wheel 88 resulting from engagement of the steering wheel 88 by the driver. In various embodiments, a speed sensor 108 measures an amount of speed (and/or changes thereof) of the vehicle 20. In certain embodiments, the speed sensor 108 is a rotational speed sensor monitoring the driveline of the vehicle 20. In various embodiments, the IMU 104 measures inertial measurement data and/or related parameters of the vehicle 20, which may include acceleration (a) and a grade or slope (w) of the roadway 24 on which the vehicle 20 is travelling.

In various embodiments, the controller 90 is coupled to, among other devices, the various sensors, the braking system 78 of the vehicle 20, and the braking system 60 of the trailer 22. For example, the trailer 22 may be electrically coupled with the vehicle 20 through a connector 110, such as a multi-pin electrical connector. In certain embodiments, the controller 90 may also be coupled with the steering system 80, the propulsion system 70, and/or one or more other systems, devices, and/or components of the vehicle 20 and/or the trailer 22. In various embodiments, the controller 90 receives sensor data, processes the sensor data, and controls braking of the vehicle 20 and of the trailer 22 (via the vehicle braking system 78 and the trailer braking system 60, respectively), based on the processing of the sensor data, such as described further below.

The controller 90 may provide various data and information for the vehicle 20. When desired, the data and/or information may be displayed for the driver through an interface 87. The interface 87 may also prompt the driver to enter information, conduct operations, and/or make selections. For example, range estimates may be displayed to the driver of the vehicle 20 through a driver information center/the operator interface 87. Also, for example, the interface 87 may be used to prompt the driver to select a saved profile for the trailer 22, when connected to the vehicle 20. Also, for example, the interface 87 may be used to prompt the driver to operate the vehicle 20 with certain inputs for data collection purposes. In other examples, a variety of information may be communicated between the driver and the controller 90 via the interface 87.

The controller 90 may provide the propulsion system 70 control functions of the vehicle 20. In embodiments, a powertrain controller 112 may be coupled in the control system 84 and in certain embodiments may be included in the controller 90. In embodiments, the powertrain control module 91 may reside in, or may comprise, the powertrain controller 112, which may be a part of the controller 90 or which may be a separate powertrain controller 112 coupled with the controller 90. The powertrain controller 112 may provide the various functions of controlling the propulsion system 70, such as by providing a torque command to operate the propulsion system 70 to propel the vehicle 20 with, or without, the trailer 22, including based on the computations and determinations described herein.

The controller 90 may also control the intensity of the braking signal sent to the braking system 60 of the trailer 22, such as from the controller 90 and/or from the gain control module 93. This function is configured to vary the signal intensity (gain level) provided to the braking system 60 of the trailer 22. The braking system 60 of the trailer 22 responds to the braking signal to apply the brakes 114 in proportion to the signal's intensity. Accordingly, the relative force with which the brakes 114 are applied in relation to the application of the brakes 85 of the vehicle 20 is controlled.

While certain parameters of the vehicle-trailer system 28 may be directly measured, such as the extent of brake actuation via the braking sensor 100, the steering angle via the steering angle sensor 102 and acceleration via the IMU 104, others may be derived or estimated. For example, the mass of the vehicle 20 and trailer 22 and the resistance forces of the vehicle 20 and the trailer 22 may be computed by the controller 90 as further described below: A resistance module 99 may be included in the controller 90 or in another controller to carry out the relevant computations involved.

Figure 3:
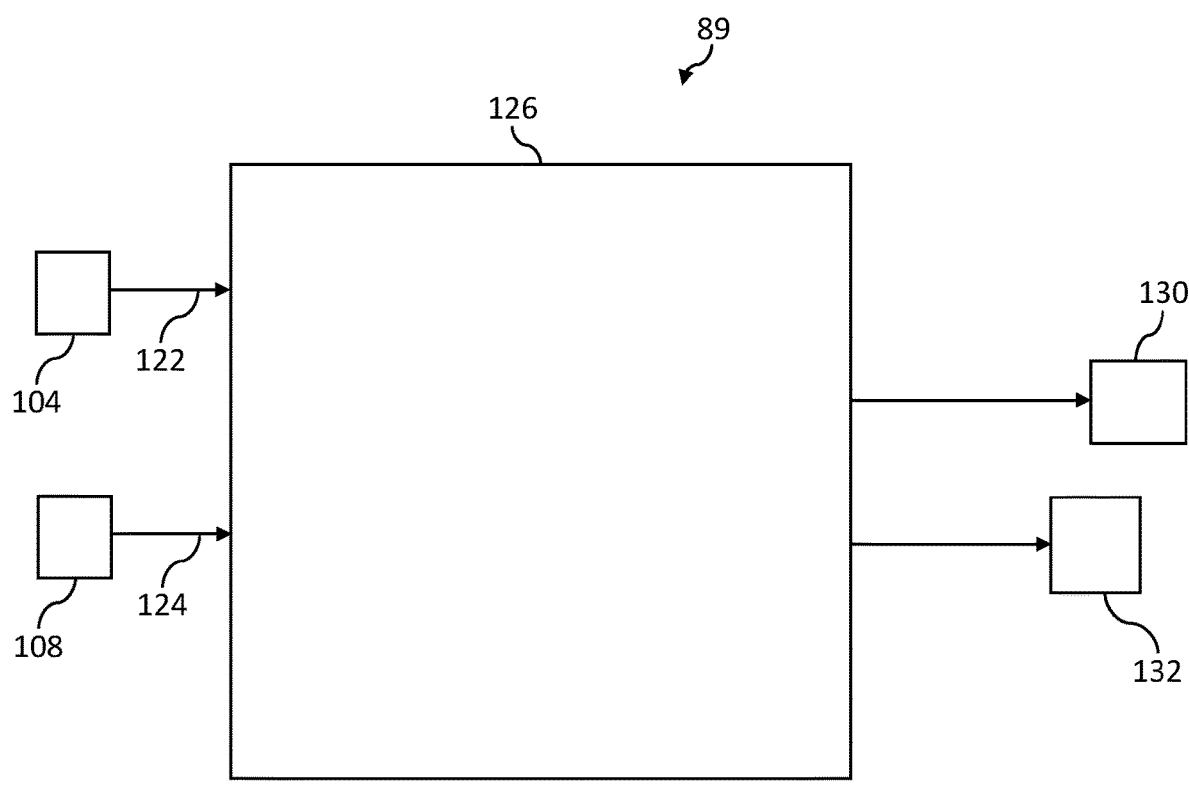
FIG. 3 is a functional block diagram of a system for determining parameters of the vehicle-trailer system of FIG. 2, in accordance with exemplary embodiments.

Referring additionally to FIG. 3, a system 89 for determining certain parameters of the vehicle-trailer system 28 is illustrated. The system 89 may be operated by the controller 90, such as by the resistance control module 99, or another module. In operation, the acceleration (a) 104 of the vehicle-trailer system 28 may be received by, or determined by, the controller 90, such as via a signal 122 from the IMU 104. In addition, the speed (velocity/v) 108 of the vehicle-trailer system 28 may be received by, or determined by, the controller 90, such as via a signal 124 from the speed sensor 108. The processor 94 may, via an identifier module 126, compute resistance force constants ($K_1$) 130 and ($K_2$) 132. The computed values may be stored, such as in the storage device 98.

As described above:

$$F_{total} = \frac{\rho C_d A v^2}{2} + m g C_{rr} + F_{gx} + F_M.$$

For the present embodiment, $F_{gx}$ may be assumed to be zero by sampling during operation on a level roadway 24. For example, when setting up a profile for the trailer 22, the controller 90, such as via the interface 87, may inform the driver of the vehicle 20 to drive on a relatively level roadway 24, prior to reading inputs from the speed sensor 108. In embodiments, input from the IMU 104, or from another input, may be used to verify that the roadway 24 is approximately level. In embodiments, an appropriate algorithm may be consumed, such as by the controller 90, to quantify the slope of the roadway 24 and factor in the $F_{gx}$ component, rather than making a zero assumption.

As noted above, in the current embodiment, $F_M$ may be accounted for by using the data correction factor/CF to address the influence of powertrain pumping torque during deceleration. For example, during development of the propulsion system 70, torque curves may be developed that plot torque versus revolutions per minute. For example, the torque curves may be developed by dynamometer testing. The torque curves may be defined for the powerplant 72. The torque curves may be developed for each gear of the transmission 65. The correction factor/CF may be determined during development and calibration of the vehicle 20 and propulsion system 70. Force may be obtained using the torque curves, which may be divided by an assumed mass to obtain the correction factor/CF. The assumed mass may, for example be the mass of the vehicle 20 plus a median mass of the typical trailers the vehicle 20 is expected to tow. It has been found that assuming mass in this manner results in accurate results with insignificant error. This acceleration related correction factor/CF may then be used to take motoring force into account when conducting other computations.

Assuming a substantially level roadway 24 and that the correction factor/CF will be considered later, the equation for longitudinal dynamics focuses on the aerodynamic resistance and rolling resistance components and becomes:

$$F_{total} = \frac{\rho C_d A V2}{2} + mg C_{rr}.$$

Converting to find acceleration may be accomplished by the relationship F=Ma. As a result, acceleration may be equated as follows: a=($\rho C_d A v^2$)/2m+$C_{rr}$ g. Because $\rho$, $C_d$, A, m and g are constants, they may be represented in a simplified form as aggregated constants. For example, $K_1$=($\rho C_d A$)/2 m and $K_2$=$C_{rr}$ g. Combining the constants into the aggregated constants $K_1$ and $K_2$ leads to the relationship: a=$K_1 v^2$+$K_2$, which is a quadratic functional relationship where acceleration is a quadratic function of velocity. Accordingly, knowing the aggregated constants $K_1$ and $K_2$ enables finding acceleration for given values of velocity. The aggregated constant $K_1$ is related to, and may be referred to, as an aerodynamic resistance constant. The aggregated constant $K_2$ is related to, may be referred to, as the rolling resistance constant. Collectively, $K_1$ and $K_2$ may be referred to as resistance force constants.

The quadratic function may be solved for $K_1$ and $K_2$ using an identification method such as least squares or that may employ another type of algorithm for parameter identification. Using the selected identification method in the identifier module 126, the equations that define the aggregated constants are:

$$K_1 = \frac{\frac{\sum a}{N} - \frac{\sum a v^2}{\sum v^2}}{\frac{\sum v^2}{N} - \frac{\sum v^4}{\sum v^2}}, \text{ and } K_2 - K_1 \frac{\sum v^2}{N} + \frac{\sum a}{N},$$

where v is velocity in kilometers per hour, a is acceleration/deceleration in meters per second squared, and N is the number of samples/data sample size. Accordingly, the processor 94, via the identifier module 126, computes and outputs the resistance force constants ($K_1$) 130 and ($K_2$) 132 using the identification method equations. The computed values of the resistance force constants $K_1$ and $K_2$ may be stored, such as in the storage device 98.

Figure 4:
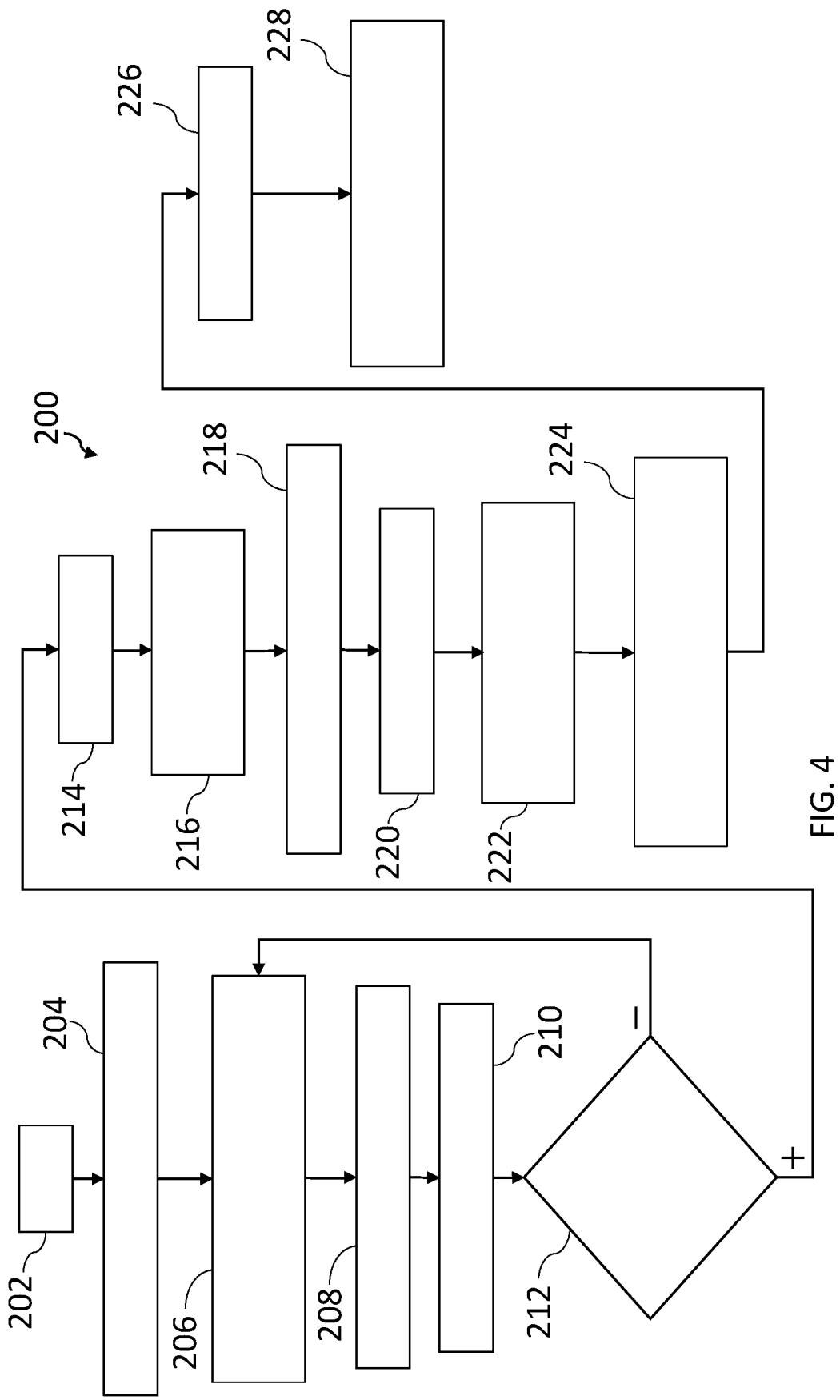
FIG. 4 is a flowchart of process for computing parameters of the vehicle-trailer system of FIG. 2, in accordance with exemplary embodiments.

Referring to FIG. 4, parameters including the resistance force constants including the aerodynamic resistance constant $K_1$ 130 and the rolling resistance constant $K_2$ 132 may be computed according to a method 200 that controls various parameters, actuators and outputs of the vehicle 20. As will be appreciated in light of the disclosure, the order of operation within the method 200 is not limited to the sequential execution as illustrated in FIG. 4, but may be performed in one or more varying orders as applicable and in accordance with the present disclosure. In various embodiments, the method 200 starts 202 and may be scheduled to run based on one or more predetermined events, and/or may run continuously during operation of the vehicle 20.

Following the start 202, and before any corrections based on operational data, default values for $K_1$ and $K_2$ as generic constants may be determined 204, directly or indirectly. For example, during the development of the vehicle 20, calibration may entail producing default curves for acceleration versus velocity that may be saved in the storage device 98, such as in table or other form. The determination 204 includes making an initial estimate that may be used as a default and/or until data based on real-world operation of the vehicle-trailer system 28 is obtained and new constants are implemented. In the determination 204, calibration may entail selecting middle of the applicable range (based on expected trailer 22 options) values for drag coefficient/$C_d$, frontal area/A mass/m, and rolling resistance coefficient/$C_{rr}$.

The values for air density/$\rho$, gravity/g may be selected as standard values. Using the selected values, the default curves and generic $K_1$ and $K_2$ values are produced and saved as part of the determination 204. In embodiments, the determination 204 may also include calibration activity in determining the correction factor/('F', such as by the method described above.

Operation of the vehicle-trailer system 28 initially includes computing 206, such as by the processor 94, using the determined 204 defaults/generic constants $K_1$ and $K_2$, aerodynamic resistance, rolling resistance and deceleration/a based on velocity/v obtained from the speed sensor 108. Initially, the predetermined curves allow estimating deceleration based on velocity with no other inputs as aerodynamic resistance and rolling resistance are factored in as estimates during the determination 204 using the generic $K_1$ and $K_2$ values. To refine the default generic values, the method 200 includes characterizing, based on the subsequent steps described below, aerodynamic resistance and rolling resistance where $K_1$ and $K_2$ are determined based on sampled coast-down data to define a refined acceleration versus velocity curve based on data points collected during coast-down of the vehicle-trailer system 28. The characterizing may begin when a trailer 22 is coupled with the vehicle 20, such as by the hitch 25 and/or as may be indicated by sensing a coupling of the connector 110. The characterization results in a unique profile for each trailer 22. The controller 90, such as by the processor 94 through the interface 87, may prompt the driver of the vehicle 20 to select a trailer from saved profiles, or when the coupled trailer 22 does not have a saved profile to initiate a learning mode.

When the driver selects the learning mode, or in other examples where the controller 90 otherwise concludes that the trailer 22 is not known, the method 200 includes initiating a vehicle learn readiness check 208 to start the characterization. In this event, the controller 90, via the processor 94 and the interface 87, may alert the driver to operate the vehicle-trailer system 28 on a level roadway 24. In embodiments, steering angle ($\delta$) may be obtained 210) from the steering angle sensor 102. In embodiments, brake force ($F_B$) may be obtained 210 from the braking sensor 100. In embodiments, grade ($\psi$) of the roadway 24 may be obtained 210 from the IMU 104. In embodiments, propulsion (axle) torque ($T_A$) may be obtained 210, such as from the powertrain control module 91. In operation of the propulsion system 70, the controller 90 and/or the powertrain control module 91 generates a torque signal, such as in response to the application of the accelerator pedal as sensed by the torque request sensor 105, to propel the vehicle 20 via the powerplant 72, and may be set by the controller 90/powertrain control module 91 as a function of the particular operating conditions of the vehicle 20. The torque signal or axle torque/$T_A$ is therefore a known value from the controller's 90/powertrain control module's 91 operation of the propulsion system 70 and may thereby be obtained 210.

The method 200 determines 212 whether the axle torque/$T_A$ request is less than a torque threshold value, whether the brake force ($F_B$) is less than a braking threshold value, and whether the steering angle is less than an angular threshold. In some embodiments, the controller 90 may assume that the driver is following the information communicated through the interface 87 and is operating the vehicle-trailer system 28 on a level roadway 24. In some embodiments, the controller 90 may determine whether the slope $\delta$ of the roadway 24 is less than a grade threshold value. The torque threshold value may be selected to indicate that the vehicle-trailer system 28 is operating in a coast-down mode. For example, the axle torque/$T_A$ request may be zero or approximately zero, meaning that the driver is not pressing on the accelerator pedal as indicated by the torque request sensor 105. The braking threshold value may be zero or approximately zero, meaning that the driver is not pressing on the brake pedal as indicated by the braking sensor 100 and the brake force ($F_B$) is approximately zero. The angular threshold for the steering angle may be compared using input from the steering angle sensor 102, where the processor 94 may compare the sensed steering angle ($\delta$) to a substantially straight steering angle ($\delta_0$). For example, the determination 212 may be whether /$\delta$/<$\delta_0$. Absolute value is used to cover both left and right turning scenarios of the steering wheel 88. Substantially straight may, for example, mean the steering is approximately straight, e.g., within ±5° of straight. For example, the determination 212 may be whether the absolute value of the steering angle is below a threshold, such as five-degrees, or another substantially straight value such as ten-degrees or less. The grade threshold value may be selected so that the grade of the roadway 24 does not result in a substantial contribution of the force of gravity ($F_g$) 44 to the total force $F_{total}$. For example, the grade threshold may be ±1% or less.

When the determination 212 is negative, meaning that one or more of the thresholds (torque threshold value, braking threshold value, angular threshold, and, in some embodiments, the grade threshold value), are surpassed, the method 200 returns to the learn readiness check 208 step and proceeds therefrom. When the determination 212 is positive, meaning all of the thresholds (torque threshold value, braking threshold value, angular threshold, and, in some embodiments, the grade threshold value), are not surpassed, the method 200 proceeds to collect 214 data. For example, the processor 94 collects 214 data via signals from the speed sensor 108 for velocity (v) samples and signals from the IMU 104 for acceleration/deceleration (a) samples as sensor inputs. Deceleration may be measured at various velocities. In embodiments, during data collection 214 the processor 94 continues to determine 212 whether the parameters are below the thresholds. If one or more parameters surpasses its respective threshold, the data collection 214 is suspended until all thresholds are not surpassed. Accordingly, the collection 214 of data may be accomplished in increments such that coasting deceleration may be measured in various vehicle velocity segments during normal driving. The method 200 proceeds with collecting 214 data for the available parameter values by the processor 94. For example, velocity (v) and acceleration/deceleration (a) may be obtained 210 from sensor inputs, such as from the speed sensor 108 and the IMU 104. The samples with velocity and deceleration values are saved, such as in the storage device 98, which may be done in a form where the data points are applied to define 216 a curve of deceleration versus velocity. For example, FIG. 5 includes curve 250 defined by points 255-257 collected during coast-down and represents the equation $a = K_1 v^2 + K_2$. As such, acceleration may be correlated to various velocities, such as over the expected operating speeds of the vehicle-trailer system 28. The processor 94 may reference, such as from the storage device 98, a curve shape as a guide based on generic drag equations and historic test data for drawing the curve 250 through a minimal number of points.

The method 200, by the processor 94, proceeds to apply 218 the data correction factor/('F to the coasting deceleration data to account for pumping torque and gear ratios. The data correction factor may be applied during the defining 216 of the curve 250. The correction factor/('F may be prepared for use as a multiplier or an addition to the data. The curve 250, defined by the real world coast-down data, is used by the processor 94 to compute 220 values of $K_1$ and $K_2$ so that the aerodynamic resistance/rolling resistance equation for deceleration versus vehicle speed is developed for the specific vehicle-trailer system 28. As noted above, $K_1$ and $K_2$ are related to velocity and acceleration and therefore may be computed by the processor 94 using the relevant equations.

Figure 5:
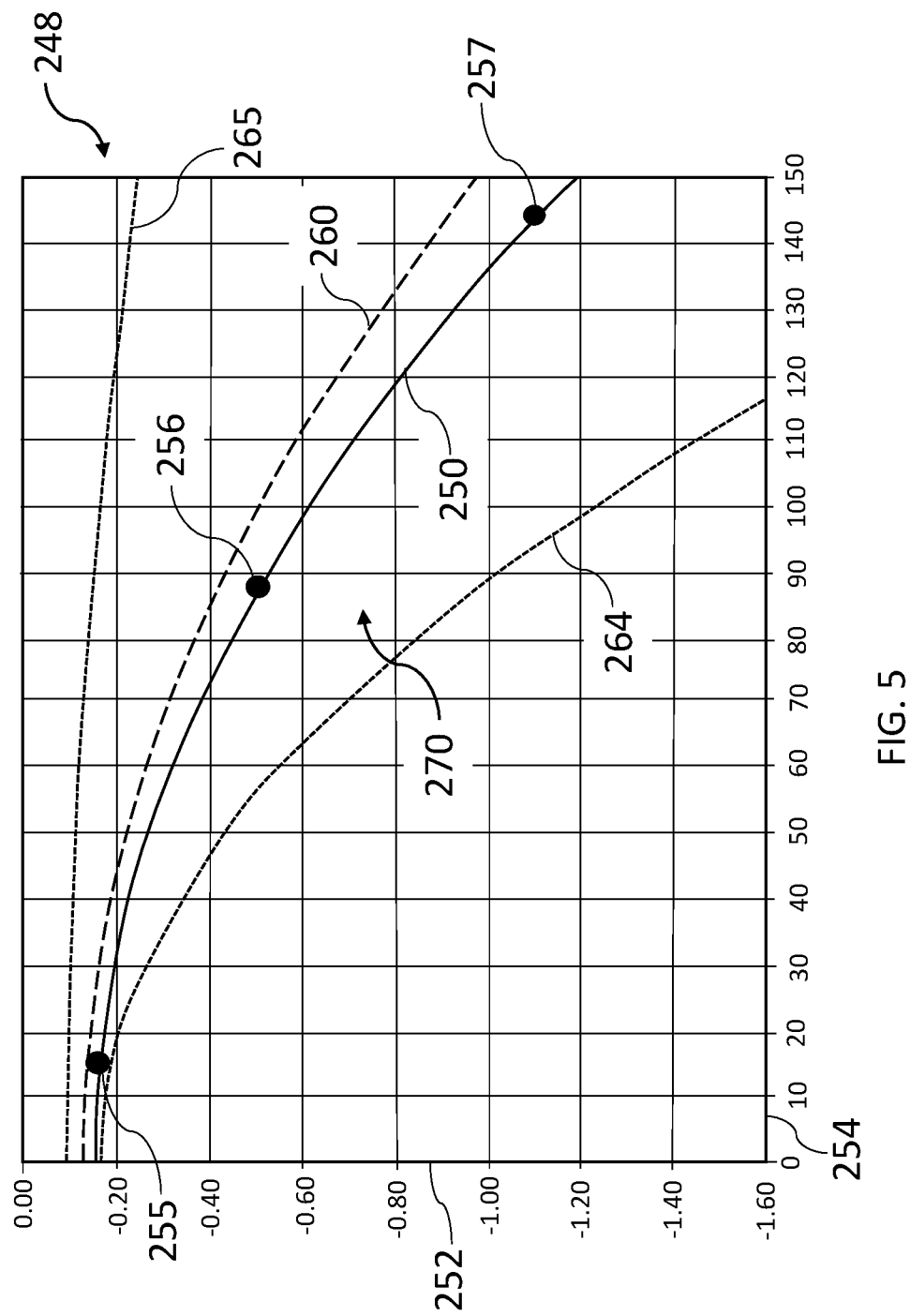
FIG. 5 is a graph of deceleration versus velocity for the vehicle-trailer system of FIG. 1, in accordance with exemplary embodiments.

The method 200 includes rationalizing or limiting 222 $K_1$ and $K_2$ (via the curve 250) against acceptable limits. Referring to FIG. 5, a graph 248 of coast-down deceleration in meters per second squared on the vertical axis 252 versus velocity in kilometers per hour on the horizontal axis 254 shows the curve 250. The curve 250 of $a=K_1v^2+K_2$ is defined through the data points 255-257 that were collected 214. Any number of data points may be used in defining the curve 250, but in embodiments, at least three data points, such as data points 255-257 may be used. The graph 248 also shows curve 260, which represents the determined 204 values from calibration. The curve 250, based on coast down data, represents a more accurate profile tailored to the trailer 22 than the generic profile of the curve 260. The graph 248 also depicts allowable data limit curves 264 and 265, which may be developed as part of the determination 204. Determining 204 the generic profile of the curve 260 may entail selecting a range of representative trailers and their parameters that the vehicle 20 is reasonably expected to tow. Given the selected representative trailer with the highest resistance forces and the selected representative trailer with the lowest resistance forces, the curves 264 and 265 may be drawn.

Using the above defined relationships, the computing 220, by the processor 94, of values for $K_1$ and $K_2$ provides results tailored to the vehicle-trailer system 28. When computing $K_1$ and $K_2$ the processor 94 limits 222 the results by the curves 264 and 265, to ensure that the results do not exceed realistic projections for use in operating the vehicle 20 and/or the trailer 22. For example, values computed 220 for $K_1$ and $K_2$ are restricted to the area 270 between the curves 264, 265.

The method 200 may proceed to compute 224 by the processor 94 values for aerodynamic resistance force and rolling resistance force for the vehicle-trailer system 28, such as by using the relationships described above. A gross combined weight of the vehicle-trailer system 28 may also be computed 224. For example, axle torque/$T_A$ may be used to determine tractive force $T_x$ using $$F_x = \frac{1}{R}T_A,$$

where R is the radius of the wheels 64. Then weight may be determined using $$T_x = W\frac{a_x}{g} + F_{total}.$$

With values available for $T_A$, R, $a_x$, g, and $F_{total}$ as described above, the weight of the vehicle-trailer system 28 may be computed 224. The values for $K_1$, $K_2$, and W may be saved 226, such as in the storage device 98 in a profile for the trailer 22.

The controller 90 may use 228 the saved 226 values in control decisions of the vehicle-trailer system 28. Using one or more of the values, the controller 90, by the processor 94, may compute command values for controlled parameters of the vehicle 20. Based on the command values, the processor 94 may control a system or systems of the vehicle. For example, the controller 90 may factor weight into control of the propulsion system 70. When the trailer 22 is coupled with the vehicle 20, the interface 87 may be used to select the saved 226 profile. In another example, the saved 226 values may be used 228 to control, by the gain control module 93, the gain/value of the signals sent to the trailer braking system 60 for actuating the brakes 114. In some embodiments, the computed 224 values may be used to refine the correction factor, such as by using an iterative approach, replacing the values that were assumed during calibration/the determination 204.

In a number of embodiments, the method 200 may include relearning. For example, if weight changes significantly, such as due to trailer loading, the controller 90 may prompt the driver, such as through the interface 87 that relearning is needed. In other embodiments, the controller 90 may initiate a relearning cycle automatically, such as by conducting steps 208-226 of the method 200.

Accordingly, coast-down data is sampled to develop relationships that define resistance force related parameters for use in vehicle and/or trailer control. The need to determine all of the parameters to compute resistance forces themselves is avoided, simplifying the data that needs to be measured. Vehicle control algorithms that use aerodynamic resistance and/or rolling resistance and/or other resistance related parameters for control functions are provided with the necessary inputs. Nonlimiting examples include vehicle range, fuel economy, and trailer brake gain scaling. The values are determined specific to individual vehicle-trailer combinations and may be stored in a trailer profile for later reference and use.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for controlling functions of a vehicle having vehicle brakes and a trailer having trailer brakes, the system comprising:
   sensors of the vehicle configured to provide sensor data comprising deceleration values across a range of speeds of the vehicle and the trailer; and
   a processor configured to:
      perform, based on the sensor data, a readiness check by determining whether the sensor data exceeds predetermined thresholds;
      compute, based on the sensor data and when the readiness check is passed, meaning the predetermined thresholds are not exceeded, values for constants that represent aerodynamic resistance and rolling resistance of the vehicle and the trailer specifically;

save the constants as a part of a profile unique to the trailer; and
control, based on the profile, functions of the vehicle and the trailer including to apply, in proportional response to application of the vehicle brakes, the trailer brakes.

2. The system of claim 1, wherein, prior to computing the constants, the processor controls the functions of the vehicle based on generic constants predetermined and stored in memory.

3. The system of claim 1, wherein the sensors comprise:
a speed sensor configured to provide speed signals representative of speed of the vehicle;
a brake sensor configured to provide brake signals representative of brake application of the vehicle; and
a steering angle sensor configured to provide steering signals representative of angles at which wheels of the vehicle are turned.

4. The system of claim 1, wherein the processor is configured to correct the values based on a motoring force of the vehicle.

5. The system of claim 1, wherein the processor is configured, prior to computing the values for the constants, to determine, from an acceleration sensor, the deceleration values during operation of the vehicle.

6. The system of claim 1, wherein the processor is configured, with input of the sensors, to collect deceleration data across the range of speeds of the vehicle and the trailer, wherein the constants are related to both acceleration and velocity.

7. The system of claim 1, wherein the processor is configured to compute, based on the constants, a combined weight of the vehicle and the trailer.

8. The system of claim 1, comprising an interface configured to communicate information to and from the processor, wherein the processor is configured to determine a weight change of the vehicle and the trailer, and is configured to communicate, through the interface and after the weight change, a need to update the constants.

9. The system of claim 1, wherein the processor is configured to access data limits from a memory and to rationalize the constants by restricting the constants to within the data limits.

10. The system of claim 1, wherein the constants comprise a first constant and a second constant, wherein the first constant represents air density, an aerodynamic drag coefficient, a frontal area of the vehicle and the trailer, and mass of the vehicle and the trailer, and the second constant represents a rolling resistance coefficient of the vehicle and the trailer and acceleration of gravity.

11. A method for controlling functions of a vehicle having vehicle brakes and a trailer having trailer brakes, the method comprising:
providing, by sensors of the vehicle, sensor data including providing deceleration values across a range of speeds of the vehicle and the trailer;
performing, by a processor and based on the sensor data, a readiness check by determining whether the sensor data exceeds predetermined thresholds;
computing, by the processor based on the sensor data and when the readiness check is passed, meaning the predetermined thresholds are not exceeded, values for constants that represent aerodynamic resistance and rolling resistance of the vehicle and trailer specifically;
saving the constants as a part of a profile unique to the trailer; and
controlling, by the processor and based on the profile, functions of the vehicle and the trailer including applying, in proportional response to application of the vehicle brakes, the trailer brakes.

12. The method of claim 11, comprising:
predetermining generic constants that represent the aerodynamic resistance and the rolling resistance of the vehicle and the trailer;
storing the generic constants in a memory accessible by the processor; and
controlling, prior to the computing of the constants and by the processor, the functions of the vehicle based on the generic constants.

13. The method of claim 11, wherein the providing the sensor data comprises:
providing, by a speed sensor, speed signals representative of speed of the vehicle;
providing, by a brake sensor, brake signals representative of brake application of the vehicle; and
providing, by a steering angle sensor, steering signals representative of angles at which wheels of the vehicle are turned.

14. The method of claim 11, comprising correcting, by the processor, the values based on a motoring force of the vehicle.

15. The method of claim 11, comprising:
determining, by the processor with input from an acceleration sensor and prior to computing the values for the constants, the deceleration values.

16. The method of claim 11, comprising collecting, by the processor with input of the sensors, deceleration data across the range of speeds of the vehicle and the trailer, wherein the computing the values for the constants includes factoring in both acceleration and velocity.

17. The method of claim 11, comprising computing, by the processor and based on the constants, a combined weight of the vehicle and the trailer.

18. The method of claim 11, comprising:
including an interface in the vehicle configured to communicate information to and from the processor;
determining, by the processor a weight change of the vehicle and the trailer; and
communicating, by the processor, through the interface and after the weight change, a need to update the constants.

19. The method of claim 11, comprising:
accessing, by the processor from a memory, data limits; and
rationalizing, by the processor, the constants by restricting the constants to within the data limits.

20. A vehicle having vehicle brakes configured to tow a trailer having trailer brakes, the vehicle comprising:
sensors of the vehicle configured to provide sensor data comprising deceleration values across a range of speeds of the vehicle and the trailer; and
a processor configured to:
perform, based on the sensor data, a readiness check by determining whether the sensor data exceeds predetermined thresholds;
compute, based on the sensor data and when the readiness check is passed, meaning the predetermined thresholds are not exceeded, a first value for a first constant that represents an aerodynamic resistance of the vehicle and the trailer, and a second constant that represents a rolling resistance of the vehicle and the trailer;
save the first constant and the second constant as a part of a profile unique to the trailer;

compute, from the first constant and the second constant;
a command value for a controlled parameter of the vehicle; and control, based on the command value, a system of the vehicle and the trailer including apply, in proportional response to application of the vehicle brakes, the trailer brakes.

\* \* \* \* \*